United States Patent Office 3,057,709
Patented Oct. 9, 1962

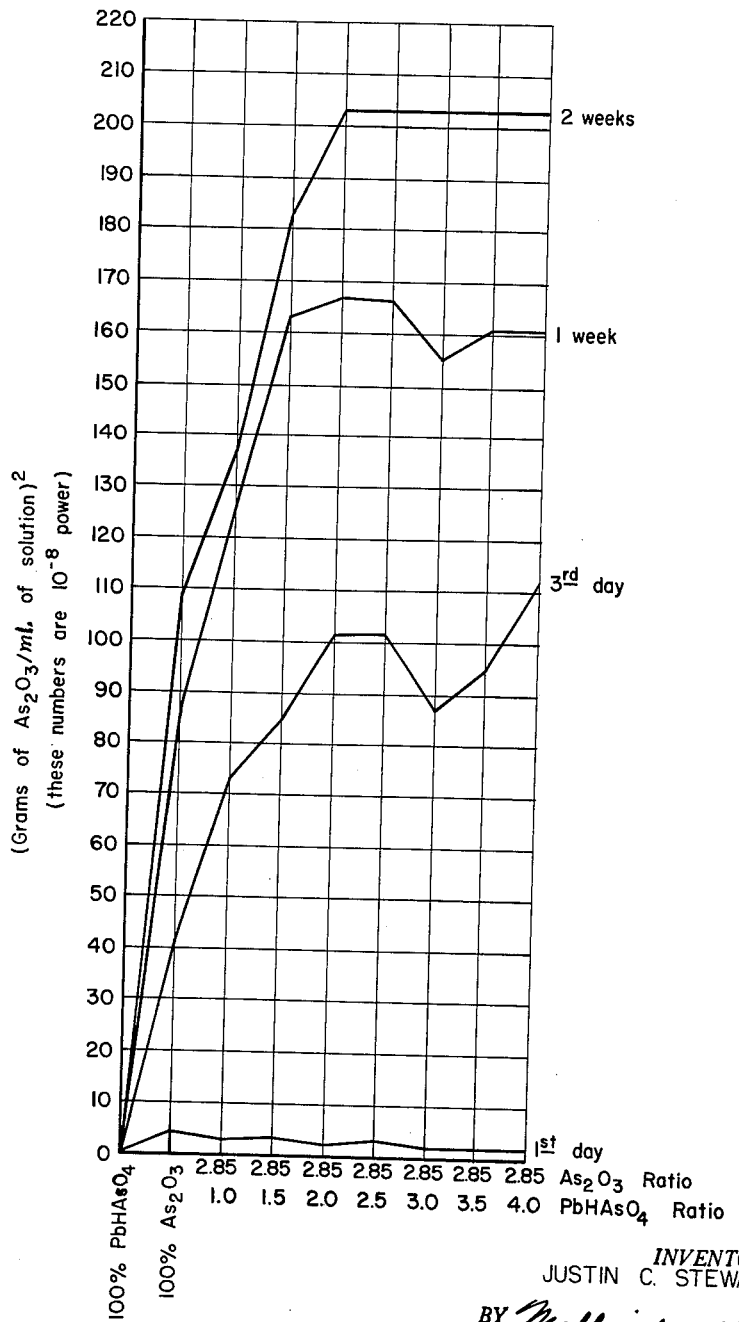

3,057,709
METHOD OF AND COMPOSITION FOR ELIMINATING CRAB GRASS INFESTATIONS
Justin C. Stewart, Salt Lake City, Utah, assignor to Utah Cooperative Association (a Farmers Union Affiliate), a corporation of Utah
Filed Nov. 16, 1959, Ser. No. 853,212
9 Claims. (Cl. 71—2.2)

This invention relates to the elimination of crab grass from lawns and other infested areas and to a selective herbicidal material active against crab grass seed on a pre-emergence basis. The present application constitutes a continuation-in-part of my similarly entitled, copending application Serial No. 631,433 filed December 31, 1956 and now abandoned.

Crab grass is a particularly noxious turf weed that has effectively resisted control measures based on the application of ordinary post-emergence herbicides to the growing plants in customary manner. A reasonably successful method of combating crab grass in the past has been the use of lead arsenate (in its dibasic form as $PbHAsO_4$) as a pre-emergence control, based on its toxic effect upon the crab grass seed. The arsenate powder is mixed with an inert carrier, such as an inorganic soil conditioner, and is spread over the area to be treated. Rain or sprinkling washes it into the surface humus layer, where it exerts a toxic effect upon the seed. Experience has shown that it has little or no toxic effect upon desirable turf grasses.

While in recent years it has been proven that lead arsenate is more reliable in its action than originally supposed by those who first experimented with its use for crab grass control (see F. A. Welton and J. C. Carroll "Crabgrass in Relation to Arsenicals," Amer. Soc. Agron. Jour 30:816–826, 1938, and "Lead Arsenate for the Control of Crabgrass" Amer. Soc. Jour. 39:413–521, 1947) and does not require the application of quite so great a quantity as originally supposed, it is still a comparatively expensive material for turf weed killing purposes, and its use has been limited for that reason.

In seeking a more readily obtainable and less expensive material for the purpose, I conceived the use of arsenous oxide ($As_2O_3$), or arsenic trioxide, as it is often called, and initiated a series of tests to determine its suitability.

Arsenic trioxide is produced in highly refined form for a variety of uses, but it is also obtainable in great quantity and at low cost in crude form as a normally waste by-product of metallurgical smelting operations of the lead and zinc industries, particularly in the Western part of the United States. Smelter flue dusts caught in the bag houses of such smelters as that of the United States Smelting, Mining, and Refining Company at Midvale, Utah, are approximately 95% arsenic trioxide.

Previously, arsenic trioxide had been known and extensively used as a soil sterilant or complete herbicide. Even though a variety of other arsenicals had been proposed and tested as pre-emergence controls for crab grass, the strongly herbicidal quantities of arsenic trioxide with respect to all growing vegetation had apparently eliminated it from serious consideration.

The tests indicated, however, that arsenic trioxide has the capacity to destroy crab grass seeds, without undue effect on ordinary turf grasses, when applied in quantities considerably less than sufficient to act as a soil sterilant. Nevertheless, the amount necessary for attaining effective control from a commercial standpoint brought about excessive turf damage and showed that arsenic trioxide is not a satisfactory commercial substitute for lead arsenate. On the other hand, comparative tests carried out with various arsenicals and various combinations of arsenicals have shown that a combination of arsenic trioxide and lead arsenate is a highly effective pre-emergence control for crab grass and that it causes no significant nor permanent damage to commonly used turf grasses, such as bluegrass, fescues, bents, and bermuda grass, when applied at rates per unit area considerably less than has been customary with any single arsenical known to be useful for this purpose.

From the results of these tests, an optimum formulation was worked out from an economic standpoint for general use, wherein lead arsenate and arsenic trioxide are present in approximately a one part to three parts by weight basis and wherein the total available and effective arsenic content is present to a greatly increased extent per unit weight of the prepared material than was economically feasible in prior formulations using lead arsenate alone.

While the economic aspect of the matter is important, in that a way has been found to make available a readily obtainable and low cost arsenical for crab grass control, as well as to considerably reduce the total quantity of control material required per unit area, early indications of superior results from use of the combined arsenicals as against use of either arsenical along in the quantity necessary to produce commercially acceptable control, have been borne out by extensive field and laboratory tests. Such tests have shown an important synergism between the combined arsenicals, chiefly as respects solubility. Thus, it has been found that the presence of lead arsenate enhances the solubility of arsenic trioxide, thereby enabling a significantly lesser quantity to be employed for pre-emergence control of crab grass than would otherwise be the case. Accordingly, I have found it possible to use a rate of application of the two arsenicals which is low enough to be non-toxic and yet high enough to give commercially acceptable control.

The principal object of my invention is, therefore, to provide an economical method and composition for giving highly effective and selective control of crab grass in turf areas.

A feature of the invention is the application, to an infested turf area, of a combination of appropriate arsenicals, particularly arsenic trioxide and lead arsenate.

Further objects and features will become apparent from the following detailed description of both method and composition, reference being made to the accompanying drawing in which the single FIGURE is a graph illustrating the effect of the presence of lead arsenate on the solubility of arsenic trioxide.

In carrying out initial large-scale field tests with various ratios of arsenic trioxide and lead arsenate, an area of turf heavily infested with large, hairy, crab grass was selected on the University of Utah campus and was divided into individual 100 square foot plots, each ten by ten feet in dimension. Of these, a number of plots which appeared to be heavily infested to about an equal extent were numbered and assorted in random fashion to receive different treatments. Three of the plots were set aside for control purposes. They were not treated in any way.

Two batches of each of four different ratios of lead arsenate and arsenic trioxide mixtures were applied to eight different test plots, using pairs of mutually adjoining plots for each set of the batches. Each batch contained the combined arsenicals on the basis of 15 pounds per 1600 square feet of turf area, together with ammonium sulfate, river sand, and expanded perlite granules on the basis of approximately 15, 12 and 4 pounds per 1600 square feet, respectively.

One of each of the paired plots was treated in November (Fall). The other was treated the following April (Spring).

Analysis for crab grass germination and survival was carried out the following September by making a chain grid to cover the center 64 square feet of each plot. The grid divided the plot into divisions of 4 square feet each, and eliminated one foot of marginal area around the plot. The crab grass was counted by pulling the plants from each grid section.

The results of these tests are shown in the following table:

Table I

| Plot No. | $As_2O_3$ lbs./1600 sq. ft. | $PbHAsO_4$ lbs./1600 sq. ft. | Plants/sq. ft., application | | Percent control, application | |
|---|---|---|---|---|---|---|
| | | | Spring | Fall | Spring | Fall |
| 61 | 5 | 10 | 1.0 | | 97.3 | |
| 60 | 5 | 10 | | 1.14 | | 97 |
| 32 | 7 | 8 | 0.28 | | 99.3 | |
| 31 | 7 | 8 | | 1.5 | | 96 |
| 52 | 9 | 6 | 0.12 | | 99.7 | |
| 51 | 9 | 6 | | 0.6 | | 98.4 |
| 48 | 11 | 4 | 0.63 | | 98.3 | |
| 40 | 11 | 4 | | 0.52 | | 98.6 |

On the basis of these results, it was determined that the opitmum proportions of arsenic trioxide and lead arsenate for a commercial product having a maximum content of arsenicals would be approximately 3 parts by weight of arsenic trioxide to 1 part of lead arsenate. Accordingly, a commercial formulation conforming to this optimum was put on the market under the brand name of Pax AR-76.

This composition contains, by weight, approximately 8.25% standard lead arsenate, 25.11% arsenic trioxide, 0.35% technical Chlordane, 35% ammonium sulfate, and the remainder expanded perlite granules. The Chlordane serves as a quick-acting pesticide for moth larvae and earth worms. The ammonium sulfate supplies nitrogen as a turf food. The perlite is merely an inert material to add bulk for spreading purposes.

Comparative tests of several crab grass herbicides were conducted on the 15th fairway of the Bel-Air Country Club of Los Angeles during the summer of 1956 by researchers working in the Department of Floriculture and Ornamental Horticulture of the University of California at Los Angeles.

The area used for the tests had been heavily and uniformly infested with hairy crab gross (*Digitaria sanguinalis*) in 1955. The turf in the area consisted of a mixture of bermuda, bluegrass, bents, and fescues. Both pre-emergence and post-emergence materials were used in these tests. Individual test plots for seven chemicals, applied at various rates and schedules, and a check plot made a total of fourteen comparative tests. The chemicals used were:

(1) Pax AR-76
(2) Alanap 1-F (1% N-1 naphthyl phthalamic acid)
(3) Crag Herbicide 1 (90% 2,4- dichlorophenoxyethyl sulfate)
(4) PMAS (10% phenyl mercuric acetate)
(5) Standard lead arsenate with Milorganite
(6) 18.90% disodium methyl arsenate anhydrous
(7) 20% sodium arsenoacetate.

All treatments were randomized in 4 replications. Each plot was 100 square feet in size.

The first applications of pre-emergence materials was made on March 1, 1956 before crab grass had begun to germinate. Crab grass seedlings in the two-leaf stage were first observed March 22, 1956. The post-emergence herbicides were first applied at this time.

Phenyl mercuric acetate applications were begun when the seedlings were small, as observations have shown this to be the most effective period for the use of this material. Disodium methyl arsenate and sodium arsenoacetate were first applied at the time of peak crab grass germination. Turf injury and discoloration notes were taken one week after treatments. Estimates of the number of crab grass plants surviving each treatment were made by counting the number of plants found in four one-square-foot plots taken at random in each treatment. These counts were made twice during the summer, on June 18 and on September 13.

The results of these tests are presented in the table below:

| Treatments ranked according to effectiveness June 1956 readings | Application dates | Application rate per 100 sq. ft. | Number of crab grass plants per sq. ft. average of 4 replications | |
|---|---|---|---|---|
| | | | June 18, 1956 | Sept. 13, 1956 |
| 1. Pax AR-76 (pre-emergence) 1 application | March 1 | 3.33 lbs. (approx. 3¼ oz. lead arsenate and 10 oz. arsenic trioxide). | 0.06 | 0.00 |
| 2. Pax AR-76 (pre-emergence) 1 application | do | 2.5 lbs | 0.06 | 0.00 |
| 3. Disodium methyl arsenate (post-emergence) 2 applications. | May 14, 23 | 0.67 oz. in 1 gal. water | 0.56 | 11.25 |
| 4. Alanap 1-F (pre-emergence) 3 applications | March 1, April 1, May 15 | 1.8 lbs | 1.06 | 1.56 |
| 5. PMAS (post-emergence) 3 applications | March 22, 29, April 15 | 0.25 oz. in 1 gal. water | 1.19 | 10.81 |
| 6. Alanap 1-F (pre-emergence) 4 applications | March 1, 29, May 14, June 22 | 1.8 lbs | 1.56 | 2.50 |
| 7. Alanap 1-F (pre-emergence) 3 applications | March 22, May 14, June 22 | 1.8 lbs | 1.56 | 22.31 |
| 8. Crag Herbicide 1 (pre-emergence) 4 applications | March 1, 29, May 14, May 23 | 0.30 oz. in 1 gal. water | 2.31 | 11.06 |
| 9. Standard lead arsenate plus Milorganite (pre-emergence) 1 application. | March 1 | 11 oz. lead arsenate plus 4 lbs. Milorganite. | 4.50 | 17.13 |
| 10. Disodium methyl arsenate (post-emergence) 3 applications. | May 14, 23, June 22 | 0.67 oz. in 1 gal. water | 5.44 | 20.50 |
| 11. Crag Herbicide 1 (pre-emergence) 4 applications | March 29, May 14, 23, June 22 | 0.30 oz. in 1 gal. water | 11.00 | 32.81 |
| 12. Experimental Herbicide 1 (post-emergence) 5 applications. | May 14, 23, June 1, 7, 22 | 0.5 oz. in 1 gal. water | 12.25 | 45.31 |
| 13. Disodium methyl arsenate (post-emergence) 1 application. | May 14 | 0.67 oz. in 1 gal. water | 12.31 | 16.44 |
| 14. Check, no treatment | | | 23.88 | 95.94 |

Comparative field tests were conducted during the summer of 1958 by the manufacturer of Pax AR-76. The tests were commenced in May and continued through much of September. They were designed to show the effect on crab grass-infested turf of respective applications of a "Pax" formulation containing only arsenic trioxide as the arsenical, only lead arsenate as the arsenical, and a combination of the two as in the commercial product. An application rate of 12.5 lbs. per 1000 sq. ft., i.e. one-half that recommended for "Pax," was adopted for these tests in order to emphasize synergistic effects for comparative purposes. The results were as follows:

| Replication | As₂O₃ | | PbHAsO₄ | | As₂O₃, PbHAsO₄ | |
|---|---|---|---|---|---|---|
| | Plants counted in 40 plugs | Calculated avg. number of plants per sq. ft. | Plants counted in 40 plugs | Calculated avg. number of plants per sq. ft. | Plants counted in 40 plugs | Calculated avg. number of plants per sq. ft. |
| 1 | 79 | 151.2 | 56 | 107.0 | 22 | 42.1 |
| 2 | 46 | 87.9 | 41 | 78.4 | 36 | 68.8 |
| 3 | 67 | 128.2 | 73 | 139.5 | 59 | 112.8 |
| 4 | 59 | 112.8 | 38 | 72.6 | 37 | 70.7 |
| 5 | 11 | 21.3 | 10 | 19.1 | 7 | 13.4 |
| 6 | 29 | 55.4 | 21 | 40.1 | 15 | 28.7 |
| 7 | 108 | 206.7 | 53 | 101.4 | 62 | 118.5 |
| 8 | 43 | 82.4 | 35 | 66.9 | 16 | 30.6 |
| 9 | 26 | 49.7 | 21 | 40.1 | 10 | 19.1 |
| 10 | 23 | 44.0 | 8 | 15.3 | 9 | 17.2 |
| 11 | 8 | 15.3 | 8 | 15.3 | 0 | 0.0 |
| 12 | 9 | 17.2 | 14 | 26.8 | 5 | 9.6 |
| 13 | 14 | 26.8 | 29 | 55.4 | 7 | 13.4 |
| 14 | 11 | 21.3 | 23 | 44.0 | 15 | 28.7 |
| 15 | 11 | 21.3 | 40 | 76.4 | 8 | 15.3 |
| 16 | 19 | 36.3 | 18 | 34.4 | 3 | 5.7 |
| 17 | 0 | 0.0 | 12 | 22.9 | 0 | 0.0 |
| 18 | 8 | 15.3 | 4 | 7.6 | 2 | 3.8 |
| 19 | 17 | 32.5 | 1 | 1.9 | 5 | 9.6 |
| 20 | 23 | 44.0 | 41 | 78.4 | 12 | 22.9 |
| Totals | 611 | 1,169.6 | 546 | 1,043.5 | 330 | 630.9 |
| Average | 30.55 | 58.48 | 27.3 | 52.175 | 16.5 | 31.5 |
| Percent control | | 56.195 | | 60.90 | | 76.40 |

Plugger used in sampling had an area of 3.7656 square inches.
Average number of crab grass plants per sq. ft.=Total plants in 20 plugs×144/20×3.7656=Average plants per plug×1.9120
Untreated check plots provided for control purposes averaged 133.5 plants per square foot.

Percent control was calculated as follows:

$As_2O_3(133.5-53.48) \div 133.5 = 59.99\%$
$PbHAsO_4(133.5-58.48) \div 133.5 = 56.95\%$
$PbHAsO_4 + As_2O_3(133.5-31.5) \div 133.5 = 76.4\%$ These tests show that arsenic trioxide is 20.2% less efficient in the control of crab grass when used alone rather than in the "Pax" combination, and that lead arsenate is 15.50% less efficient. This serves to confirm the tests reported in the October 1956 issue (vol. 6 No. 4) of "Southern California Turfgrass Culture" as presented previously herein.

In none of these tests was there any noticeable injury to turf grasses.

In addition to the above, work carried out under my direction has shown that areas treated with mixtures of arsenic trioxide and lead arsenate are less toxic to the seeds of common varieties of turf grasses than are areas treated with either of these arsenicals alone, given the quantity necessary to produce effective control from a commercial standpoint. This is demonstrated by comparing Welton & Carroll's work (supra) with the results shown above to be achieved by this invention.

That one of the combined arsenicals has a beneficial effect on the other with respect to achieving pre-emergence control of crab grass in turf areas is clearly demonstrated by a series of laboratory solubility tests and by germination tests carried out in a greenhouse.

For the solubility tests, reagent grade lead arsenate and reagent grade arsenic trioxide were added to respective samples of distilled water and to respective samples of a soil solution. The soil solution was prepared by allowing fifty grams of sandy loam to soak in one liter of distilled water for a period of three days, with intermittent agitation. The lead arsenate used for these tests had the following analysis:

| | Percent |
|---|---|
| Insoluble in HNO₃ | 0.009 |
| Chloride (Cl) | 0.004 |
| Nitrate (NO₃) | 0.030 |
| Substances not precipitated by: | |
| H₂S (as SO₄) | 0.090 |
| Copper (Cu) | 0.005 |
| Iron (Fe) | 0.001 | while the arsenic trioxide had the following:

| | Percent |
|---|---|
| Assay (As₂O₃) | 99.99 |
| Residue after ignition | 0.006 |
| Insoluble in NH₄OH | 0.005 |
| Chloride (Cl) | 0.002 |
| Sulfide (S) | 0.001 |
| Antimony (Sb) | 0.0001 |
| Lead (Pb) | 0.0005 |
| Iron (Fe) | 0.0001 |

Arsenic trioxide concentration was determined by iodine titration.

While a similar effect was apparent in both series of tests, it was more pronounced where the soil solution was the dissolving agency. Accordingly, the results from those latter tests were used in preparing the graph of the accompanying drawing.

Determinations for solubility of arsenic trioxide were made at intervals of one day, three days, one week, and two weeks on a series of flasks containing 1000 cubic centimeters of soil solution into which various ratios of arsenic trioxide and lead arsenate had been introduced, the flasks having been left at room temperature for the time periods concerned. Similar solubility determinations were made for control purposes on a flask containing only the soil solution and arsenic trioxide and on one containing only the soil solution and lead arsenate. Such determinations were carried out for a total of five replications, the results being averaged and used in the preparation of the graph. No single replication gave results at variance with the generalization. The particular ratios of arsenic trioxide used and the averaged results are tabulated as follows:

FIRST DAY

| Ratio by weight | As₂O₃, concentration g./ml. | Concentration[2] |
|---|---|---|
| Only PbHAsO₄ (2.85 g.) | 0 | 0 |
| Only As₂O₃ (2.85 g.) | $2.12 \times 10^{-4}$ | $4.5 \times 10^{-8}$ |
| 2.85–1.0 | $1.765 \times 10^{-4}$ | $3.12 \times 10^{-8}$ |
| 2.85–1.5 | $1.795 \times 10^{-4}$ | $3.22 \times 10^{-8}$ |
| 2.85–2.0 | $1.51 \times 10^{-4}$ | $2.28 \times 10^{-8}$ |
| 2.85–2.5 | $1.765 \times 10^{-4}$ | $3.12 \times 10^{-8}$ |
| 2.85–3.0 | $1.425 \times 10^{-4}$ | $2.03 \times 10^{-8}$ |
| 2.85–3.5 | $1.482 \times 10^{-4}$ | $2.195 \times 10^{-8}$ |
| 2.85–4.0 | $1.44 \times 10^{-4}$ | $2.075 \times 10^{-8}$ |

THIRD DAY

| Ratio by weight | As₂O₃, concentration g./ml. | Concentration[2] |
|---|---|---|
| PbHAsO₄ | 0 | 0 |
| As₂O₃ | $6.46 \times 10^{-4}$ | $41.7 \times 10^{-8}$ |
| 2.85–1.0 | $8.49 \times 10^{-4}$ | $72.1 \times 10^{-8}$ |
| 2.85–1.5 | $9.2 \times 10^{-4}$ | $84.7 \times 10^{-8}$ |
| 2.85–2.0 | $10.06 \times 10^{-4}$ | $101.3 \times 10^{-8}$ |
| 2.85–2.5 | $10.06 \times 10^{-4}$ | $101.3 \times 10^{-8}$ |
| 2.85–3.0 | $9.34 \times 10^{-4}$ | $87.2 \times 10^{-8}$ |
| 2.85–3.5 | $9.77 \times 10^{-4}$ | $95.6 \times 10^{-8}$ |
| 2.85–4.0 | $10.48 \times 10^{-4}$ | $109.9 \times 10^{-8}$ |

FIRST WEEK

| Ratio by weight | As₂O₃, concentration g./ml. | Concentration[2] |
|---|---|---|
| Only PbHAsO₄ | 0 | 0 |
| Only As₂O₃ | $9.36 \times 10^{-4}$ | $87.6 \times 10^{-8}$ |
| 2.85–1.0 | $10.98 \times 10^{-4}$ | $120.7 \times 10^{-8}$ |
| 2.85–1.5 | $12.78 \times 10^{-4}$ | $163.3 \times 10^{-8}$ |
| 2.85–2.0 | $12.93 \times 10^{-4}$ | $167.4 \times 10^{-8}$ |
| 2.85–2.5 | $12.92 \times 10^{-4}$ | $166.9 \times 10^{-8}$ |
| 2.85–3.0 | $12.48 \times 10^{-4}$ | $156.0 \times 10^{-8}$ |
| 2.85–3.5 | $12.7 \times 10^{-4}$ | $161.3 \times 10^{-8}$ |

SECOND WEEK

| | | |
|---|---|---|
| PbHAsO$_4$ | 0 | 0 |
| As$_2$O$_3$ | 10.45×10$^{-4}$ | 109.1×10$^{-8}$ |
| 2.85–1.0 | 11.72×10$^{-4}$ | 137.3×10$^{-8}$ |
| 2.85–1.5 | 13.53×10$^{-4}$ | 183.2×10$^{-8}$ |
| 2.85–2.0 | 14.25×10$^{-4}$ | 203 ×10$^{-8}$ |
| 2.85–2.5 | 14.25×10$^{-4}$ | 203 ×10$^{-8}$ |
| 2.85–3.0 | 14.25×10$^{-4}$ | 203 ×10$^{-8}$ |
| 2.85–3.5 | 14.25×10$^{-4}$ | 203 ×10$^{-8}$ |
| 2.85–4.0 | 14.25×10$^{-4}$ | 203 ×10$^{-8}$ |

By the fourteenth day, those flasks containing greater ratios of lead arsenate had reached equilibrium as to the amount of arsenic trioxide which would go into solution under exacting conditions of temperature, etc. Those containing the two lowest quantities of lead arsenate were still progressing toward equilibrium.

These carefully controlled tests results show that lead arsenate provides no soluble, titratable material, but that, over a reasonably short period of time, the rapidity of dissolution of the arsenic trioxide is greatly increased by the presence of lead arsenate. In fact, the increase in rapidity of dissolution is proportional to the quantity of lead arsenate present, although as the quantity is increased beyond the ratio of about one to one the efficiency of the lead arsenate in this respect became less. It is clear that more arsenic is brought into soil solution when both are present than when either is present alone.

That solubility is of importance in the achievement of superior results by the composition of the invention is clearly shown by the fact that no seeds are killed when placed directly in the dry composition and left there for a considerable period of time. Activity of the composition when practically applied in the field follows the same schedule as the laboratory solubility tests. If Kentucky bluegrass seeds are planted in a treated area, they germinate and establish normal growth if planted at the time of treatment. If planted one week later however, germination is reduced; if two weeks later, germination is seriously reduced; if three weeks later, little or no germination occurs. The latter time is the period of greatest toxicity after a field application of the composition. After that, toxicity tapers off. At the end of two and a half to three months after treatment, the seeds can again be planted without danger.

Crab grass seeds are affected sooner in this time schedule and for a longer period of time because of their greater sensitivity to arsenicals.

For the greenhouse germination tests, Petri dishes were prepared containing soil and the respective arsenicals to be tested. Each dish contained 40 grams of soil spread out to a depth of ¼ inch. This is comparable to field conditions, wherein for most soils the zone of arsenical penetration is approximately ¼ inch.

Inasmuch as very low rates of the arsenicals concerned are effective under ideal conditions of distribution and their comparative performance can be best appreciated when tested at the lowest effective concentration, soil-arsenical ratios ranging from 0.089172% to 0.62089% were used for each of the arsenic trioxide alone, lead arsenate alone, and the two combined in "Pax" ratio. The lowest ratio in the range was equal to an arsenical application rate of 1.2 pounds per 1000 sq. ft.

In each instance, the arsenical was intimately mixed with the soil and sufficient water to make a slurry prior to placement in the dish. This provided enough water to carry seed germination through to completion of the test.

The arsenicals used were of the same analysis as in the solubility tests. In each instance, a series of tests were made with the particular arsenical present in the following quantities:

Test:           Arsenical in grams
1 ---------------------------------- 0.0357
2 ---------------------------------- 0.0714
3 ---------------------------------- 0.1071
4 ---------------------------------- 0.1428
5 ---------------------------------- 0.1785
6 ---------------------------------- 0.2142
7 ---------------------------------- 0.2499

The dishes were each seeded with 0.1 gram of nine month old crab grass seed. Field conditions were approximated by holding the dishes in the refrigerator at 5° C. for three weeks and by then placing them in a greenhouse for germination. Each series was replicated six times, and six check dishes prepared in the same way as the others but without arsenical were run as controls, one for each replication.

After ten days in the greenhouse, the check or control dishes indicated that germination was complete. Accordingly, observations were undertaken at that time.

Previous trials had indicated that it is impractical to attempt to determine percent control and that the lowest rate of arsenical application at which no germination occurs is a reliable criterion for evaluation of the relative effectiveness of various arsenicals.

In order to positively determine such lowest rate, 100 seeds were picked off with tweezers from those Petri dishes at the lowest arsenical concentration showing no indications of germination and were examined under a dissecting microscope for any physical evidence of germination. No evidence was observed in any instance. These seeds were then thoroughly washed with distilled water to remove all traces of arsenical and were placed on arsenical-free soil under ideal germination conditions. No germination occurred.

The results of these confirmed observations are shown in the following table:

| Particular replication | Lowest rate of application showing control | | |
|---|---|---|---|
| | As$_2$O$_3$ | "Pax" combination | PbHAsO$_4$ |
| 1 | 0.2142 | 0.1428 | No control. |
| 2 | 0.2499 | 0.1428 | Do. |
| 3 | 0.2142 | 0.1428 | Do. |
| 4 | 0.2499 | 0.1785 | Do. |
| 5 | 0.2142 | 0.1785 | Do. |
| 6 | 0.1785 | 0.1428 | Do. |
| Average | 0.2142 | 0.1428 | Do. |

It can be seen that the "Pax" combination of arsenicals (2.85 parts As$_2$O$_3$ to 1 part PbHAsO$_4$) gave the best control of crab grass seed germination in each replication.

As indicated, lead arsenate gave no control. This is not in conformity with field testing, where the lead arsenate gave control at least equal to that of arsenic trioxide. The explanation undoubtedly lies in the fact that, at the rates used, an insufficient period of time was involved in the tests for any control to be exercised. Field applications of lead arsenate are usually made months prior to the germination period for crab grass seed. It is not feasible to run greenhouse tests over such a long period, since the addition of water disturbs the position of the arsenical with respect to the seed and keeping the dishes in a saturated atmosphere brings on attack by fungi even at low temperatures.

It is highly significant that, even though lead arsenate alone showed no control at these low rates of application and for the short time period involved, it did in combination with arsenic trioxide significantly enhance the control afforded by that arsenical alone.

That these germination tests correlate well with what was observed in the field tests, as well as the laboratory solubility tests, is indicated by the fact that the time schedule of activity is approximately the same in all three situations. Thus, the solubility tests indicate that equilibrium is reached in approximately two and one half to three weeks. Seed toxicity tests in the field indicate that "Pax" applications reach their greatest toxicity level in two and one half to three weeks, with a gradual tapering off period thereafter. Germination studies indicate that if the plates are seeded and set to germinate immediately, higher rates of arsenical are required than if field conditions are approximated by holding the plates at low temperature in the refrigerator for three weeks prior to being placed for germination.

That the hastened solution of the arsenic trioxide by the lead arsenate is of importance in the pre-emergence control of crab grass seed is indicated by similar Petri dish germination studies set up in washed silica sand, rather than soil. The sand-containing dishes required only one-tenth the range of arsenic to cause pre-emergence seed destruction as was required by the soil-containing dishes.

All natural soils other than straight sand have arsenic fixing capacity. Arsenicals in solution are fixed by the clay particles, by certain metallic hydroxides, and by colloidal organic material. That the fixed arsenical is less active as a seed toxicant than free arsenicals in solution is demonstrated by the much lower arsenical rate required in sand tests as compared to soil tests. Since soil fixation of arsenical materials occurs constantly, the more rapidly the arsenic trioxide goes into solution, the more free arsenic trioxide would be found in the soil solution prior to fixation of the material by the soil. Consequently by speeding up the solution of arsenic trioxide without speeding up the soil fixation, the lead arsenate supplies a higher rate of free arsenic trioxide in the soil solution for what is obviously a critical period.

Field tests were made by William H. Daniel at Purdue University in 1958, using lead arsenate in comparison with the commercial "Pax" product. The resins in terms of percent crab grass infestation are shown in the following table:

| Rates per 1000 square feet: | Percent crab grass infestation |
|---|---|
| Lead arsenate (98% actual arsenical), lbs.— | |
| 16 | 18 |
| 20 | 15 |
| 24 | 12 |
| Pax AR-76 (combined arsenicals—33.36%), lbs.— | |
| 12 | 30 |
| 18 | 10 |
| 25 | 5 |

The results in terms of percent crab grass control and the same per pound of arsenical are shown in the following table:

| Rates per 1000 sq. ft.: | Percent crab grass control |
|---|---|
| Lead arsenate (98% actual arsenical), lbs.— | |
| 15.68 | 82 |
| 19.60 | 85 |
| 23.52 | 88 |
| Pax AR-76 (combined arsenicals—33.36), lbs.— | |
| 4.02 | 70 |
| 6.01 | 90 |
| 8.34 | 95 |

From the averages shown in the above table, it can be seen that the combination of arsenicals in the product of this invention is 3.2 times more effective than comparable rates of lead arsenate alone.

Other tests have indicated that a combination of calcium arsenate with lead arsenate acts in much the same way as the arsenic trioxide-lead arsenate combination, although not to so great an extent. In other words, the combination gives more effective pre-emergence control of crab grass than does either used alone.

While crab grass is the most widespread of noxious turf weeds and has received the most attention, it has been found that the composition of the invention is also applicable to the pre-emergence control of various other noxious turf weeds, such as annual bluegrass (*Poa annua*) and common dandelion (*Taraxicum officinale*). It is also active on a pre-emergence basis against various other common weeds, such as foxtail (Setaria sp.) and wild barley (Hordium sp.).

Whereas there are here illustrated and described certain preferred compositions and procedures which I presently regard as the best mode of carrying out my invention, it should be understood that various changes may be made without departing from the disclosed inventive subject matter particularly pointed out and distinctly claimed herebelow.

I claim:
1. A pre-emergence herbicide, comprising arsenic trioxide; and lead dibasic arsenate, each being present in concentration effective as a pre-emergence control for turf weeds, the combined concentrations being fatally injurious to seeds of turf weeds but substantially harmless to turf grasses.
2. The composition of claim 1, wherein the quantity of arsenic trioxide is approximately three times the quantity of lead dibasic arsenate.
3. A pre-emergence herbicide, comprising lead dibasic arsenate; and an arsenical selected from the group consisting of arsenic trioxide and calcium arsenate, each being present in concentration effective as a pre-emergence control for turf weeds, the combined concentrations being fatally injurious to seeds of turf weeds but substantially harmless to turf grasses.
4. A composition for the pre-emergence destruction of crab grass in turf areas, comprising an inert carrier; arsenic trioxide; and lead dibasic arsenate, each being present in concentration effective as a pre-emergence control for turf weeds, the combined concentrations being fatally injurious to seeds of turf weeds but substantially harmless to turf grasses.
5. The composition of claim 4, wherein the quantity of arsenic trioxide is approximately three times the quantity of lead dibasic arsenate.
6. A composition for the pre-emergence destruction of crab grass in turf areas, comprising an inert carrier; lead dibasic arsenate; and an arsenical selected from the group consisting of arsenic trioxide and calcium arsenate, each being present in concentration effective as a pre-emergence control for turf weeds, the combined concentrations being fatally injurious to seeds of turf weeds but substantially harmless to turf grasses.
7. A method of destroying crab grass seed in turf areas, comprising spreading over the surface of a turf area containing crab grass seed in a dormant state at least a seed-killing quantity of a composition containing an inert carrier; arsenic trioxide; and lead dibasic arsenate, each being present in concentration effective as a pre-emergence control for turf weeds, the combined concentrations being fatally injurious to seeds of turf weeds but substantially harmless to turf grasses.
8. The method of claim 7, wherein the composition contains approximately three times as much arsenic trioxide as lead dibasic arsenate.
9. A method of destroying crab grass seed in turf areas, comprising spreading over the surface of a turf area containing crab grass seed in a dormant state at least a seed-killing quantity of a composition containing an inert carrier; lead dibasic arsenate; and an arsenical selected from the group consisting of arsenic trioxide and calcium arsenate, each being present in concentration effective as a pre-emergence control for turf weeds, the combined concentrations being fatally injurious to seeds of turf weeds but substantially harmless to turf grasses.

References Cited in the file of this patent

UNITED STATES PATENTS 1,967,628    Rose _____ July 24, 1934

(Other references on following page)

OTHER REFERENCES

McNulty et al., in "Utah Acad. Sci. Proceedings," vol. 32, 1955.

Grigsby in "Chemical Abstracts," vol. 46, 1952, col. 1696–1697.

Dybing et al. in "Weeds," vol. 3, October 1954, No. 4, pages 377–385.

Welton et al. in "Jr. Am. Soc. Agronomy," vol. 30, 1938, pages 816–826.

Welton et al. in "Jr. Am. Soc. Agronomy," vol. 39, 1947, page 513.

Ahlgren et al.: "Principles of Weed Control," pages 258 and 259, copyright 1951, John Wiley and Sons, Inc., N.Y.

Frear: "Chemistry of Pesticides," 3rd ed., page 393, January 1955.

McNulty et al., in "Chemical Abstracts," vol. 53, No. 13, July–August 1959, col. 12570(b).